United States Patent
Jin et al.

(10) Patent No.: US 10,797,287 B2
(45) Date of Patent: Oct. 6, 2020

(54) ORGANIC/INORGANIC COMPOSITE POROUS MEMBRANE, AND SEPARATOR AND ELECTRODE STRUCTURE COMPRISING THE SAME

(71) Applicant: LG CHEM, LTD., Seoul (KR)

(72) Inventors: Sun-Mi Jin, Daejeon (KR); Hyung-Kyun Yu, Daejeon (KR); Joo-Sung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 351 days.

(21) Appl. No.: 14/895,423

(22) PCT Filed: Oct. 31, 2014

(86) PCT No.: PCT/KR2014/010386
§ 371 (c)(1),
(2) Date: Dec. 2, 2015

(87) PCT Pub. No.: WO2015/065116
PCT Pub. Date: May 7, 2015

(65) Prior Publication Data
US 2016/0118636 A1    Apr. 28, 2016

(30) Foreign Application Priority Data

Oct. 31, 2013 (KR) .................. 10-2013-0131527
Oct. 31, 2014 (KR) .................. 10-2014-0150289

(51) Int. Cl.
*H01M 2/16* (2006.01)
*H01M 2/14* (2006.01)
(Continued)

(52) U.S. Cl.
CPC ......... *H01M 2/1653* (2013.01); *C08J 5/2206* (2013.01); *H01M 2/145* (2013.01);
(Continued)

(58) Field of Classification Search
CPC ................ H01M 2/145; H01M 2/166
See application file for complete search history.

(56) References Cited

U.S. PATENT DOCUMENTS 5,631,103 A * 5/1997 Eschbach .............. H01M 6/181
429/303
6,976,647 B2 * 12/2005 Reed ....................... B02C 17/16
241/172

(Continued)

FOREIGN PATENT DOCUMENTS

CN    1806351 A    7/2006
CN    1851957 A    10/2006

(Continued)

OTHER PUBLICATIONS

Rogers, Everything you need to know about polystyrene (PS) (Year: 2015).*

(Continued)

*Primary Examiner* — Ula C Ruddock
*Assistant Examiner* — Anna Korovina
(74) *Attorney, Agent, or Firm* — Birch, Stewart, Kolasch & Birch, LLP

(57) ABSTRACT

The present disclosure provides an organic/inorganic composite porous membrane, comprising: one or more particles selected from inorganic particles and organic particles; and a binder polymer, wherein said one or more particles selected from inorganic particles and organic particles are bonded with each other by the binder polymer surrounding the surface of the particles, and said one or more particles are filled at a rate of 60 to 70% in the membrane.

19 Claims, 1 Drawing Sheet

(51) Int. Cl.
 *C08J 5/22* (2006.01)
 *H01M 10/052* (2010.01)
(52) U.S. Cl.
 CPC ......... *H01M 2/166* (2013.01); *H01M 2/1646* (2013.01); *H01M 2/1686* (2013.01); *H01M 10/052* (2013.01); *H01M 2220/30* (2013.01)

(56) References Cited

U.S. PATENT DOCUMENTS

| | | | |
|---|---|---|---|
| 2006/0046149 A1* | 3/2006 | Yong | H01M 2/166 429/251 |
| 2006/0105245 A1 | 5/2006 | Ikuta et al. | |
| 2006/0216608 A1 | 9/2006 | Ohata et al. | |
| 2009/0111025 A1* | 4/2009 | Lee | H01M 2/166 429/251 |
| 2009/0117467 A1* | 5/2009 | Zhamu | H01M 4/133 429/231.8 |
| 2010/0196688 A1* | 8/2010 | Kritzer | H01M 2/162 428/220 |
| 2010/0196750 A1 | 8/2010 | Kajita et al. | |
| 2010/0316903 A1* | 12/2010 | Kim | H01M 2/1653 429/145 |
| 2011/0033743 A1* | 2/2011 | Lee | H01M 2/1653 429/145 |
| 2011/0045168 A1* | 2/2011 | Seo | H01M 2/1646 427/58 |
| 2011/0052962 A1 | 3/2011 | Suzuki et al. | |
| 2012/0231321 A1* | 9/2012 | Huang | H01M 2/145 429/144 |
| 2013/0017429 A1 | 1/2013 | Ha et al. | |
| 2013/0022858 A1 | 1/2013 | Mazur et al. | |
| 2013/0171499 A1* | 7/2013 | Yang | H01M 2/162 429/145 |
| 2013/0209861 A1* | 8/2013 | Yong | C08J 5/18 429/145 |
| 2013/0244082 A1 | 9/2013 | Lee et al. | |
| 2013/0280583 A1* | 10/2013 | Lee | H01M 2/1686 429/144 |
| 2014/0050965 A1* | 2/2014 | Ha | H01M 2/164 429/144 |
| 2014/0370358 A1 | 12/2014 | Hong et al. | |
| 2015/0037652 A1 | 2/2015 | Kim et al. | |

FOREIGN PATENT DOCUMENTS

| | | | | |
|---|---|---|---|---|
| CN | 101945931 A | 1/2011 | | |
| CN | 103000848 A | 3/2013 | | |
| CN | 103035866 A | 4/2013 | | |
| EP | 0 711 199 A1 | 5/1996 | | |
| JP | 2001-250529 A | 9/2001 | | |
| JP | 2006-139978 A | 6/2006 | | |
| JP | 2010-205719 A | 9/2010 | | |
| KR | 10-2007-0000231 A | 1/2007 | | |
| KR | 10-2008-0106881 A | 12/2008 | | |
| KR | 10-2009-0056811 A | 6/2009 | | |
| KR | 10-2011-0104791 A | 9/2011 | | |
| KR | 20120093772 A | * | 8/2012 | ............ H01M 2/164 |
| KR | 10-2013-0066746 A | 6/2013 | | |
| KR | 10-2013-0097679 A | 9/2013 | | |
| TW | 201320446 A1 | 5/2013 | | |
| WO | WO 2005/011043 A1 | 2/2005 | | |
| WO | WO 2012137847 A1 | * | 10/2012 | ............ H01M 2/162 |
| WO | WO-2013070031 A1 | * | 5/2013 | ........... H01M 2/1686 |

OTHER PUBLICATIONS

Lesman NPL, Dielectric constants for common materials, http://www.lesman.com/train/dielectric-constants.html (Year: 2020).*
AZO Materials Alumina NPL, https://www.azom.com/properties.aspx?ArticleID=52 (Year: 2020).*
International Search Report, issued in PCT/KR2014/010386, dated Feb. 24, 2015.

* cited by examiner

ORGANIC/INORGANIC COMPOSITE POROUS MEMBRANE, AND SEPARATOR AND ELECTRODE STRUCTURE COMPRISING THE SAME

TECHNICAL FIELD

The present disclosure relates to an organic/inorganic composite porous membrane which is used in an electrochemical device such as a lithium secondary battery, more specifically an organic/inorganic composite porous membrane wherein inorganic particles and a binder are uniformly mixed, and a separator and an electrode structure comprising the same.

This application claims priority to Korean Patent Application No. 10-2013-0131527 filed in the Republic of Korea on Oct. 31, 2013, which is incorporated herein by reference.

Also, this application claims priority to Korean Patent Application No. 10-2014-0150289 filed in the Republic of Korea on Oct. 31, 2014, which is incorporated herein by reference.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

Among currently available secondary batteries, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

In order to solve the above safety-related problems of the electrochemical device, there has been proposed a separator having an organic/inorganic porous coating layer formed by coating at least one surface of a porous substrate having multiple pores with a mixture of inorganic particles and a binder polymer (Korean Patent Application Publication No. 10-2007-231). In said separator, the inorganic particles in the porous active layer formed on the porous substrate act as a kind of spacer that keeps a physical shape of the porous active layer, so the inorganic particles restrain thermal shrinkage of the polyolefin porous substrate when the electrochemical device is overheated.

Meanwhile, the organic/inorganic porous coating layer is obtained from a mixture of inorganic particles and a binder polymer, in which it is important to maintain the uniform distribution of the inorganic particles and the binder polymer in organic/inorganic porous coating layer for the purpose of preparing a high-performance separator. However, since various factors may affect the uniform distribution of the inorganic particles and the binder polymer in organic/inorganic porous coating layer, it is difficult to obtain an organic/inorganic porous coating layer maintaining the uniform distribution of the components. Therefore, there is a need for developing a method for preparing an organic/inorganic porous coating layer wherein inorganic particles and a binder polymer are uniformly distributed.

DISCLOSURE

Technical Problem

The present disclosure is designed to solve the above-mentioned problems, and therefore it is an object of the present disclosure to provide an organic/inorganic composite porous membrane wherein inorganic particles and a binder are uniformly distributed, and a preparation method thereof.

Another object of the present disclosure is to provide a separator comprising the organic/inorganic composite porous membrane.

Still another object of the present disclosure is to provide an electrode structure comprising the organic/inorganic composite porous membrane.

Technical Solution

In order to accomplish the above object, in accordance with one aspect of the present disclosure, there is provided an organic/inorganic composite porous membrane, comprising: one or more particles selected from inorganic particles and organic particles; and a binder polymer, wherein said one or more particles selected from inorganic particles and organic particles are bonded with each other by the binder polymer surrounding the surface of the particles, and said one or more particles are filled at a rate of 60 to 70% in the membrane.

According to a preferred embodiment of the present disclosure, the binder polymer is present at an amount of 1 to 30 parts by weight based on 100 parts by weight of one or more particles selected from the inorganic particles and the organic particles.

According to a preferred embodiment of the present disclosure, the inorganic particles are selected from the group consisting of inorganic particles having a dielectric constant of 5 or higher, inorganic particles having the ability to transport lithium ions, and a mixture thereof.

According to a preferred embodiment of the present disclosure, the organic particles are selected from the group consisting of polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof.

According to a preferred embodiment of the present disclosure, the binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, polystyrene, polyethylene, and a mixture thereof.

In the organic/inorganic composite porous membrane according to a preferred embodiment of the present disclosure, one or more particles selected from inorganic particles and organic particles are filled and bound to each other by the binder polymer, from which interstitial volumes are formed between the particles, and the interstitial volumes between the particles become empty spaces to form pores.

According to a preferred embodiment of the present disclosure, the organic/inorganic composite porous membrane has a thickness of 0.5 to 50 μm.

In accordance with another aspect of the present disclosure, there is provided a method for preparing an organic/inorganic composite porous membrane for an electrochemical device, comprising providing unit particles where one or more particles selected from inorganic particles and organic particles or an agglomerate of the particles are surrounded with a binder polymer; and applying heat to the unit particles to make the unit particles be bonded with each other.

According to a preferred embodiment of the present disclosure, the unit particles may have an average diameter of 0.01 to 20 μm.

According to a preferred embodiment of the present disclosure, the binder polymer in the unit particles is present at an amount of 1 to 30 parts by weight based on 100 parts by weight of one or more particles selected from the inorganic particles and the organic particles.

According to a preferred embodiment of the present disclosure, the step of applying heat to the unit particles is carried out at a temperature of 5 to 100° C. higher than the melting point of the binder polymer, for bonding of the unit particles.

According to a preferred embodiment of the present disclosure, the inorganic particles are selected from the group consisting of inorganic particles having a dielectric constant of 5 or higher, inorganic particles having the ability to transport lithium ions, and a mixture thereof.

According to a preferred embodiment of the present disclosure, the organic particles are selected from the group consisting of polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof.

According to a preferred embodiment of the present disclosure, the binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, polystyrene, polyethylene, and a mixture thereof.

In the organic/inorganic composite porous membrane prepared according to a preferred embodiment of the present disclosure, one or more particles selected from inorganic particles and organic particles are filled and bound to each other by the binder polymer, from which interstitial volumes are formed between the particles, and the interstitial volumes between the particles become empty spaces to form pores.

According to a preferred embodiment of the present disclosure, the organic/inorganic composite porous membrane has a thickness of 0.5 to 50 μm.

In accordance with still another aspect of the present disclosure, there is provided an electrochemical device, comprising a cathode, an anode, and a separator interposed between the cathode and the anode, wherein the separator is the organic/inorganic composite porous membrane according to the present disclosure.

In accordance with yet still another aspect of the present disclosure, there is provided an electrochemical device, comprising a cathode, an anode, and a separator interposed between the cathode and the anode, wherein the separator comprises a porous substrate having multiple pores, and the organic/inorganic composite porous membrane according to the present disclosure, formed on at least one surface of the porous substrate.

In accordance with yet still another aspect of the present disclosure, there is provided an electrode structure, comprising an electrode current collector; an electrode active material layer formed on at least one surface of the electrode current collector; and the organic/inorganic composite porous membrane according to the present disclosure, formed on another surface of the electrode current collector.

In accordance with yet still another aspect of the present disclosure, there is provided an electrochemical device, comprising a cathode, an anode, and an electrolyte solution, wherein at least one of the cathode and the anode is the electrode structure according to the present disclosure.

Advantageous Effects

The organic/inorganic composite porous membrane of the present disclosure comprises inorganic particles and a binder polymer distributed uniformly therein, thereby exhibiting the improved filling rate of the inorganic particles and the binder polymer, as compared with a conventional organic/inorganic composite porous membrane.

More specifically, the present disclosure provides an organic/inorganic composite porous membrane prepared by applying heat to unit particles where one or more particles selected from inorganic particles and organic particles or an agglomerate of the particles are surrounded with a binder polymer so that the unit particles are bonded with each other.

According to the present disclosure, since the organic/inorganic composite porous membrane is prepared from the unit particles, it can maintain the more uniform distribution of the inorganic particles and the binder polymer therein, as compared with those prepared according to a conventional method that comprises drying a suspension obtained by dispersing one or more particles selected from inorganic particles and organic particles and a binder polymer at once in a solvent.

The organic/inorganic composite porous membrane can be used in the separator of an electrochemical device, or in an electrode structure.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

EXPLANATION OF REFERENCE NUMERALS

Figure 1:
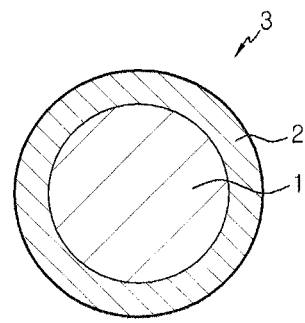
FIG. 1 schematically shows unit particles according to one embodiment of the present disclosure.

1: Inorganic Particles and Substitute thereof
2: Binder Polymer
3: Unit Particle
5: Electrode Active Material
10: Porous Substrate
20: Electrode Current Collector
11, 21: Organic/Inorganic Composite Porous Membrane
22: Electrode Active Material Layer

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The present disclosure provides an organic/inorganic composite porous membrane, comprising: one or more particles selected from inorganic particles and organic particles; and a binder polymer, wherein said one or more particles selected from inorganic particles and organic particles are bonded with each other by the binder polymer surrounding the surface of the particles, and said one or more particles are filled at a rate of 60 to 70% in the membrane.

In the present disclosure, the filling rate of the particles in organic/inorganic composite porous membrane means a fraction of the volume filled with the particles in the organic/inorganic composite porous membrane, and it is calculated as a rate of the volume of particles being actually filled, relative to the volume of a unit cell that corresponds to a parallelepiped to be filled with particles.

Conventional organic/inorganic composite porous membranes for a separator have been prepared by dissolving a binder polymer in a solvent to obtain a binder polymer solution, adding and dispersing inorganic particles thereto to obtain a slurry, and coating the slurry on a porous substrate, followed by drying. Such a conventional method is difficult to control the uniform distribution of inorganic particles and a binder polymer in the slurry, and also the uniform distribution thereof during coating and drying of the slurry. Therefore, the conventional organic/inorganic composite porous membranes have the problem that the inorganic particles and the binder polymer are not uniformly dispersed.

In order to solve this problem, the present inventors have studied to develop a method for distributing the inorganic particles and the binder polymer uniformly in an organic/inorganic composite porous membrane.

Generally, when spherical particles are filled maximally in a face-centered cubic (fcc) structure, the filling rate thereof becomes 74%.

The organic/inorganic composite porous membrane according to one embodiment of the present disclosure consists of unit particles surrounded with a binder polymer on the surface of the particles, and the unit particles are controlled to have a uniform size by passing through a filter, thereby having a filling rate of 60 to 70% which is close to the maximum filling rate, 74% of the fcc structure.

On the contrary, since conventional organic/inorganic composite porous membranes are prepared by coating a slurry of inorganic particles, a binder polymer and a solvent on a substrate, followed by drying, the packing density itself thereof is not uniform, and the binder becomes agglomerated in some portions thereof to have a filling rate of the inorganic particles in the range of 50% or less, while having about 60% filling rate of the inorganic particles in another portions thereof, and also causing pore closure. Thus, the conventional organic/inorganic composite porous membranes have large variations in the filling rate.

The present inventors have endeavored to maintain the uniform distribution of inorganic particles and a binder polymer for the purpose of improving the filling rate of the inorganic particles as compared with a conventional method, and found that such a matter can be achieved by first producing unit particles where the inorganic particles are bonded with each other by the binder polymer, and then inducing the bonding of the unit particles by heat to allow for the inorganic particles and the binder polymer being immobilized in the unit particles to be bonded with each other by heat.

That is, in the case of the organic/inorganic composite porous membrane according to the present invention, since one or more particles selected from inorganic particles and organic particles coated with a binder polymer are used at first, a binder polymer is uniformly distributed, thereby allowing the particles to be uniformly filled in a rate of 60 to 70%, preferably 65 to 70%. However, in the case of conventional organic/inorganic composite porous membranes, it is basically difficult to control the binder polymer to be uniformly distributed, making the content of the binder polymer be varied locally, so there is a portion with a low filling rate of about 50% together with a portion with a relatively high filling rate of about 60%.

More specifically, according to one embodiment of the present disclosure, the binder polymer exists in the whole or a part of one or more particles selected from inorganic particles and organic particles, and the particles are bonded with each other by the binder polymer.

Hereinafter, the organic/inorganic composite porous membrane for an electrochemical device according to one embodiment of the present invention, characterized by the uniform distribution of one or more particles selected from inorganic particles and organic particles, will be further described by a preparation method thereof, but the present disclosure is not limited to the method.

The organic/inorganic composite porous membrane may be prepared by a method, comprising providing unit particles where one or more particles selected from inorganic particles and organic particles or an agglomerate of the particles are surrounded with a binder polymer; and applying heat to the unit particles to make the unit particles be bonded with each other.

The organic particles refer to those that are light, and have superior strength and good heat-resistance, and may be used as a substitute of inorganic particles. Specific examples of the organic usable in the present disclosure may include polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof, but are not limited thereto. That is, the organic particles are a substance capable of replacing inorganic particles used in a conventional organic/inorganic composite porous membrane. As used herein, one or more particles selected from inorganic particles and organic particles also called "inorganic particles or substitute thereof".

In the unit particles according to the present disclosure, inorganic particles or a substituent thereof may be surrounded with binder particles, or an agglomerate of the particles or the substituent may be surrounded with binder particles.

FIG. 1 schematically shows unit particles according to one embodiment of the present disclosure, but the form of the unit particles is not limited thereto. Referring to FIG. 1, an inorganic particle 1 or a substituent thereof is surrounded with a binder polymer 2 to obtain a unit particle 3. The form of the unit particle is not limited.

It is preferred that the unit particles have a uniform form and size so as to provide an organic/inorganic composite porous membrane having the uniform distribution of the particles. According to one embodiment of the present disclosure, for the uniform form and size of the unit particles, the unit particles may be formed by a continuous process by way of uniform pore separation, not shear rupturing that produces uneven particles.

The unit particles may have an average diameter of 0.01 to 20 μm, preferably 0.05 to 10 μm. When the particle diameter satisfies such range, it allows the formation of a separator having a uniform thickness.

In organic/inorganic composite porous membrane of the present disclosure, the inorganic particles which are used in the formation of the porous membrane are not particularly limited if they are electrochemically stable. That is, the inorganic particles which may be used in the present disclosure are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present disclosure preferably include inorganic particles having a dielectric constant of 5 or higher, preferably 10 or higher. Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

Also, as the inorganic particles, inorganic particles having the ability to transport lithium ions, i.e., lithium-containing inorganic particles which can transfer lithium ions without holding them, may be used. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4-Li_2S-SiS_2$, $P_2S_5$ type glass ($Li_xP_yS_z$, $0<x<3$, $0<y<3$, $0<z<7$) such as $LiI-Li_2S-P_2S_5$, and a mixture thereof.

Meanwhile, the organic particles are selected from the group consisting of polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof, but are not limited thereto.

In organic/inorganic composite porous membrane of the present disclosure, the inorganic particles or a substituent thereof are not limited to their size, but may have a size of 0.001 to 10 μm so as to form the membrane in a uniform thickness and obtain a suitable porosity. If the size is smaller than 0.001 μm, dispersibility may be lowered, making it difficult to control properties. If the size is larger than 10 μm, the thickness of the organic/inorganic composite porous membrane may increase to deteriorate mechanical properties and a short circuit may be caused due to excessively large pore size while batteries are charged and discharged.

In organic/inorganic composite porous membrane of the present disclosure, the binder polymer used in the formation of the membrane is not particularly limited if it has been conventionally used in the art. Non-limiting examples of a binder polymer being usable may include polyvinylidene fluoride-co-hexafluoropropylene, polyvinylidene fluoride-co-trichloroethylene, polymethylmethacrylate, polyacrylonitrile, polyvinylpyrrolidone, polyvinylacetate polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, polystyrene, polyethylene, and a mixture thereof. Besides the above examples, any one with the above-mentioned properties may be used alone or in the form of a mixture. Preferably, any one selected from the group consisting of polyvinylidene fluoride-co-hexafluoropropylene, cyanoethyl polyvinyl alcohol, acrylonitrile-styrene-butadiene copolymer, polyethylene may be used in terms of easily providing adhesiveness between the particles.

The binder polymer in the unit particles is present at an amount of 1 to 30 parts by weight, preferably 2 to 20 parts by weight, based on 100 parts by weight of one or more particles selected from the inorganic particles or a substituent thereof. If the amount of the binder polymer is less than 1 part by weight, the inorganic particles may be released. If the amount of the binder polymer is more than 30 parts by weight, the binder polymer closes pores to raise resistance, thereby lowering the porosity of the organic/inorganic composite porous membrane.

When applying heat to the unit particles thus obtained, the binder polymer in the unit particles is melted to bond the unit particles with each other. Preferably, the step of applying heat to the unit particles is carried out at a temperature of 5 to 100° C. higher than the melting point of the binder polymer, so as to obtain the adhesiveness of the unit particles. In this case, the binder polymer that is present in the outermost of the unit particles is bound by way of slight melting around the melting point thereof. That is, in the organic/inorganic composite porous membrane, the binder polymer is present as a coating layer in the whole or a part of the surface of the inorganic particles or a substituent thereof, and the inorganic particles or a substituent thereof are immobilized and connected and with each other by the coating layer in the state that the inorganic particles are filled in contact with each other, from which interstitial volumes are formed between the inorganic particles. The interstitial volumes between the inorganic particles or a substituent thereof become empty spaces to form pores. That is, the binder polymer allows the inorganic particles or a substituent thereof to be attached with each other so that the inorganic particles or a substituent thereof can maintain their binding state. For example, the binder polymer immobilizes and connects the inorganic particles or a substituent thereof with each other. Also, the pores of the organic/inorganic composite porous membrane are formed as a result that the interstitial volumes between the inorganic particles or a substituent thereof become empty spaces, and the pores are a space restricted by inorganic particles being actually faced in a closed packed or densely packed structure of the inorganic particles or a substituent thereof. Such pores of the organic/inorganic composite porous membrane may provide a transfer path of lithium ions that are necessary for battery operation.

Besides the above-mentioned inorganic particles and the binder polymer, the organic/inorganic composite porous membrane may further comprise an additional additive.

More specifically, the organic/inorganic composite porous membrane of the present disclosure may be prepared by obtaining a suspension containing unit particles where one or more particles selected from inorganic particles and organic particles or an agglomerate of the particles are surrounded with a binder polymer; coating the suspension; and applying heat to the coated suspension to make the unit particles be bonded with each other.

According to a preferred embodiment of the present disclosure, the unit particles may be uniformly obtained through pores of a uniform membrane. For example, after mixing a binder polymer and inorganic particles or a substituent thereof in a solvent to obtain a solution, the solution is passed through a membrane filter with uniform pores and dropped in an aqueous solution containing a surfactant. The aqueous solution maintains its temperature above the boiling point of the solvent, and the drops of the solution are solidified directly after passing through the membrane filter, thereby forming the unit particles. The unit particles thus formed are suspended in a solvent to obtain a coating suspension for preparing the organic/inorganic composite porous membrane of the present disclosure. The suspension may further comprise an additional additive, besides the above-mentioned inorganic particles and the binder polymer. It is preferred that the solvent to be used for melting the binder polymer has a solubility similar to the binder polymer. Non-limiting examples of usable solvents may include acetone, methanol, ethanol, isopropyl alcohol, tetrahydrofuran, methylene chloride, chloroform, dimethyl formamide, N-methyl-2-pyrrolidone (NMP), cyclohexane, and a mixture thereof.

The organic/inorganic composite porous membrane according to the present disclosure can function alone as a separator. That is, the organic/inorganic composite porous membrane can be effectively used alone as a separator interposed between a cathode and an anode. In accordance with another aspect of the present disclosure, there is provided an electrochemical device, comprising a cathode, an anode, and a separator interposed between the cathode and the anode, wherein the separator is the organic/inorganic composite porous membrane according to the present disclosure.

Also, the organic/inorganic composite porous membrane according to the present disclosure can be formed on a porous substrate having multiple pores, thereby functioning as a separator. That is, the organic/inorganic composite porous membrane formed on at least one surface of a porous substrate can be interposed as a separator between a cathode and an anode. In accordance with still another aspect of the present disclosure, there is provided an electrochemical device, comprising a cathode, an anode, and a separator interposed between the cathode and the anode, wherein the separator comprises a porous substrate having multiple pores, and the organic/inorganic composite porous membrane formed on at least one surface of the porous substrate.

Figure 2:
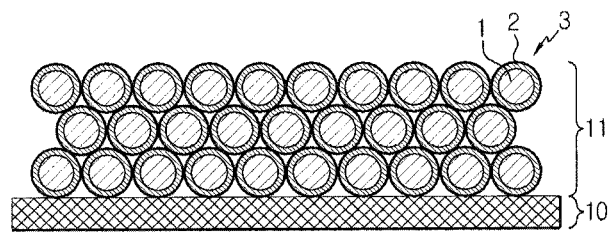
FIG. 2 schematically shows a separator according to one embodiment of the present disclosure.

Referring to FIG. 2 that schematically shows a separator according to one embodiment of the present disclosure, the separator of the present disclosure comprises a porous substrate 10 and an organic/inorganic composite porous membrane 11 which is formed on at least one surface of a porous substrate and comprises inorganic particles or a substituent thereof 1 being bonded with each other by a binder polymer 2 surrounding the whole or a part of the particles.

The porous substrate may be a porous polymer film substrate or a porous polymer non-woven substrate. The porous polymer film substrate may be made of polyolefins such as polyethylene and polypropylene, as well known in the art. Such a polyolefin-based porous polymer film substrate has, for example, a shut-down function at a temperature of 80 to 130° C. Also, besides the polyolefins, the porous polymer film may be made of polymers such as polyesters.

Also, the porous polymer non-woven may be made of polyesters such as polyethylene terephthalate (PET).

Examples of usable porous substrates with pores may be a porous substrate made of at least one selected from polyolefin, polyethylene terephthalate, polybutylene terephthalate, polyacetal, polyamide, polycarbonate, polyimide, polyether ether ketone, polyether sulfone, polyphenylene oxide, polyphenylene sulfide, polyethylene naphthalate and a mixture thereof. The porous substrate is not limited if it has been conventionally used as a separator in the art. The porous substrate may be in the form of a membrane or a non-woven fabric. The thickness of the porous substrate is not particularly limited, but is preferably in the range of 5 to 50 μm. Also, the size of pores in the porous substrate and the porosity thereof are not particularly limited, but are preferably in the range of 0.01 to 50 μm, and 10 to 95%, respectively.

The electrochemical devices may be any device in which electrochemical reactions may occur, and specific examples of the electrochemical devices include all kinds of secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured by a conventional method known in the art, for example, by interposing the foregoing separator between a cathode and an anode and introducing an electrolyte solution.

The separator of the present disclosure may be used together with any electrode which is not particularly limited, and the electrode may be manufactured by binding an electrode active material to an electrode current collector according to a conventional method known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

In one embodiment of the present disclosure, an electrolyte consisting of a salt and an organic solvent capable of dissolving or dissociating the salt may be used. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of a battery depending on the manufacturing processes and desired physical properties of a final product. Specifically, the electrolyte may be introduced before battery assembly or in the final step of battery assembly.

Also, in accordance with yet still another aspect of the present disclosure, there is provided an electrode structure, comprising an electrode current collector; an electrode active material layer formed on at least one surface of the electrode current collector; and the organic/inorganic composite porous membrane according to the present disclosure, formed on another surface of the electrode current collector.

Figure 3:
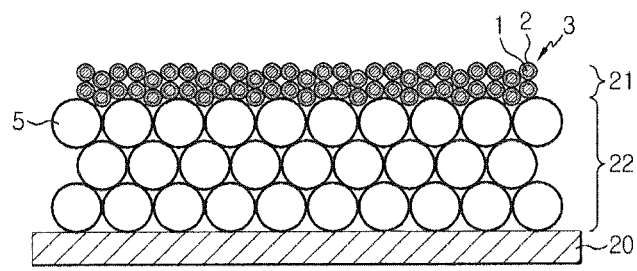
FIG. 3 schematically shows an electrode structure according to one embodiment of the present disclosure.

Referring to FIG. 3 that schematically shows an electrode structure according to one embodiment of the present disclosure, the electrode structure of the present disclosure comprises an electrode current collector 20, an electrode active material layer 22 formed on at least one surface of the electrode current collector and comprising an electrode active material 5; and an organic/inorganic composite porous membrane 21 which is formed on another surface of the electrode current collector and comprises inorganic particles or a substituent thereof 1 being bonded with each other by a binder polymer 2 surrounding the whole or a part of the particles.

The organic/inorganic composite porous membrane in the electrode structure is the same as defined above. Hereinafter, one embodiment of a method for preparing the electrode structure having an electrode current collector and an organic/inorganic composite porous membrane formed on an electrode comprising an electrode active material will be described in detail below.

The method for preparing the electrode structure of the present disclosure comprises obtaining a suspension containing unit particles where one or more particles selected from inorganic particles and organic particles or an agglomerate of the particles are surrounded with a binder polymer; coating the suspension on another surface of an electrode active material layer that is formed on at least one surface of an electrode current collector; and applying heat to the suspension coated on the electrode active material layer to make the unit particles be bonded with each other or make the unit particles be bonded with the electrode active material layer.

In the preparation method of the electrode structure, the suspension is coated on the electrode, i.e., on another surface of an electrode active material layer with no electrode current collector in the electrode, the electrode active material layer being formed on at least one surface of an electrode current collector.

When applying heat to the suspension coated on the electrode active material layer, the binder polymer in the unit particles is melted to bond the unit particles with each other or bond the unit particles with the electrode active material layer. In this case, the binder polymer that is present in the outermost of the unit particles is bound by way of slight melting around the melting point thereof.

The electrode active material layer may have a thickness of 0.5 to 200 μm. When such thickness range is satisfied, the electrode active material layer can provide its functions that are suitable for uses.

Also, the organic/inorganic composite porous membrane that is formed on the electrode active material layer may have a thickness of 0.5 to 50 μm. When the organic/inorganic composite porous membrane satisfies such thickness range, it may be formed uniformly on the electrode active material layer, thereby acting as an insulating layer.

In the organic/inorganic composite porous membrane included in the electrode structure, the binder polymer is present at an amount of 1 to 30 parts by weight, preferably 2 to 20 parts by weight, based on 100 parts by weight of inorganic particles or a substituent thereof. If the amount of the binder polymer is less than 1 part by weight, the organic/inorganic composite porous membrane may have poor anti-peeling property duo to a very small amount of the binder polymer. If the amount of the binder polymer is more than 30 parts by weight, the membrane as an insulating layer undergoes a decrease in pore size and porosity due to excessive amounts of the binder polymer.

Since the organic/inorganic composite porous membrane of the present disclosure acts as an insulating layer on the electrode, an electrode structure with an insulating layer can be provided.

The electrode structure thus prepared can be used in an electrochemical device. More specifically, the present disclosure provides an electrochemical device, comprising a cathode, an anode, and an electrolyte solution, wherein the cathode, the anode, or both of them is the electrode structure according to the present disclosure. The electrochemical device has an organic/inorganic composite porous membrane that can act as an insulating layer, thereby replacing a conventional separator.

The electrode current collector may be any one which has been conventionally used in the art. When the electrode is used as a cathode, a cathode current collector may be aluminum foils, nickel foils or a combination thereof. When the electrode is used as an anode, an anode current collector may be copper foils, gold foils, nickel foils, copper alloy foils or a combination thereof, but the present disclosure is not limited to such kinds.

The slurry for preparing the electrode active material layer may comprise an electrode active material, a binder and a solvent, and if necessary, a conductive material and other additives. The electrode active material may be any one which has been conventionally used in the art. When the electrode is used as a cathode, a cathode active material may be lithium manganese oxides, lithium cobalt oxides, lithium nickel oxides, lithium iron oxides, or lithium composite oxides thereof. When the electrode is used as an anode, an anode active material may be lithium, lithium alloys, and lithium intercalation materials such as carbon, petroleum coke, activated carbon, graphite and other carbonaceous materials, or non-carbonaceous materials such as metals, metal alloys, but the present disclosure is not limited thereto.

The electrochemical device includes any device in which electrochemical reactions may occur, and specific examples of the electrochemical device include all kinds of primary batteries, secondary batteries, fuel cells, solar cells or capacitors.

For example, the electrochemical device may be prepared by carrying out assembling using the above-mentioned electrode with the organic/inorganic composite porous membrane, not using a conventional porous polyolefin separator having micropores, by way of winding or stacking, followed by introducing an electrolyte solution therein.

In the present disclosure, the introduction of the electrolyte solution may be carried out in any suitable step during the manufacturing of a battery depending on the manufacturing processes and desired physical properties of a final product. Specifically, the electrolyte may be introduced before battery assembly or in the final step of battery assembly. Also, since the electrode of the present disclosure is an integrated form of a separator and electrodes, it may not essentially need a conventional separator, but the electrode with the organic/inorganic composite porous membrane of the present disclosure may be assembled with a porous polyolefin separator having micropores.

The electrochemical device prepared by the above-mentioned method is preferably lithium secondary batteries, including a metallic lithium secondary battery, a lithium ion secondary battery, a lithium polymer secondary battery and a lithium ion polymer secondary battery.

Example 1

<Preparation of Separator with Organic/Inorganic Composite Porous Membrane>

10 wt % of polystyrene was added and dissolved in methylene chloride at 50° C. for about 12 hours to obtain a binder polymer solution. Thereto, alumina powder was added as inorganic particles so that the weight ratio of the inorganic particles and the binder polymer is 10:1. The resulting mixture was passed through a filter with a pore size of 1 μm or less and dropped into an aqueous solution containing Tween 20. By maintaining the aqueous solution at 25° C., the mixture was solidified directly after being dropped in the aqueous solution, to obtain unit particles where the inorganic particles were surrounded with the binder polymer on the surface thereof. Then, CMC as a thickener was added to the aqueous solution to obtain a slurry. The slurry thus obtained was coated by way of dip coating on both surfaces of a 12 μm-thick porous polyethylene film (porosity 45%), to which heat of 80° C. was applied, thereby allowing the outermost binder polymer to be bound by way of slight melting. The organic/inorganic composite porous membrane thus obtained was observed through an SEM photograph thereof. As a result, the filling rate of the inorganic particles was calculated to be 70%.

<Preparation of Lithium Secondary Battery>
Preparation of Anode 96 wt % of carbon powder as an anode active material, 3 wt % of polyvinylidene fluoride (PVdF) as a binder, and 1 wt % of carbon black as a conductive material were added in N-methyl-2-pyrrolidone (NMP) as a solvent, to obtain a slurry of anode materials. The slurry was coated on a 10 μm-thick thin film of copper (Cu) as an anode current collector, followed by drying, to prepare an anode. The anode was subject to roll pressing.

Preparation of Cathode 92 wt % of Li—Co composite oxide as a cathode active material, 4 wt % of carbon black as a conductive material, 4 wt % of PVdF as a binder were added to N-methyl-2-pyrrolydone as a solvent, to obtain a slurry of cathode materials. The slurry was coated on a 20 μm-thick thin film of aluminum (Al) as a cathode current collector, followed by drying, to prepare an anode. The anode was subject to roll pressing.

Preparation of Battery

The separator and the electrodes prepared above were assembled by way of stacking. To the resulting assembly, an electrolyte solution of 1M $LiPF_6$ in a mixture of ethylene carbonate:ethyl methyl carbonate (EC/EMC=1:2) was introduced to prepare a lithium secondary battery.

Example 2

Preparation of Slurry for Organic/Inorganic Composite Porous Membrane 10 wt % of polystyrene was added and dissolved in methylene chloride at 50° C. for about 12 hours to obtain a binder polymer solution. Thereto, alumina powder was added as inorganic particles so that the weight ratio of the inorganic particles and the binder polymer is 10:1. The resulting mixture was passed through a filter with a pore size of 1 μm or less and dropped into an aqueous solution containing Tween 20. By maintaining the aqueous solution at 25° C., the mixture was solidified directly after being dropped in the aqueous solution, to obtain unit particles where the inorganic particles were surrounded with the binder polymer on the surface thereof. Then, CMC as a thickener was added to the aqueous solution to obtain a slurry.

Preparation of Slurry for Anode Active Material Layer 96 wt % of carbon powder as an anode active material, 3 wt % of CMC-SBR as a binder, and 1 wt % of carbon black as a conductive material were added in distilled water ($H_2O$), to obtain a slurry for an anode active material layer.

Preparation of Slurry for Cathode Active Material Layer 92 wt % of Li—Co composite oxide ($LiCoO_2$) as a cathode active material, 4 wt % of carbon black as a conductive material, 4 wt % of CMC-SBR as a binder were added to N-methyl-2-pyrrolydone as a solvent, to obtain a slurry for a cathode active material layer.

Preparation of Battery comprising Insulating Layer

The slurry for an anode active material layer was coated on a 15 μm-thick copper current collector, followed by drying and compressing, and the slurry for an organic/inorganic composite porous membrane was coated thereon. Thereto, heat of 80° C. was applied, thereby allowing the outermost binder polymer to be bound by way of slight melting, to obtain an anode structure comprising an insulating layer. The organic/inorganic composite porous membrane thus obtained was observed through an SEM photograph thereof. As a result, the filling rate of the inorganic particles was calculated to be 70%.

Similarly, the slurry for a cathode active material layer was coated on a 15 μm-thick aluminum current collector, to obtain a cathode structure.

The coated anode and the coated cathode obtained above assembled by way of stacking, without no conventional polyolefin separator. To the resulting assembly, an electrolyte solution of 1M $LiPF_6$ in a mixture of ethylene carbonate, propylene carbonate and diethyl carbonate (EC/PC/DEC=30/20/50 wt %) was introduced to prepare a lithium secondary battery.

Comparative Example 1

5 wt % of polyvinylidene fluoride-co-hexafluoropropylene (PVdF-HFP) was added and dissolved in acetone at 50° C. for about 12 hours, to obtain a binder polymer solution. Thereto, $Al_2O_3$ powder was added as inorganic particles so that the weight ratio of the binder polymer and $Al_2O_3$ is 10:90, and was pulverized and dispersed by way of ball milling for 12 hours to obtain a slurry. The slurry thus obtained was coated by way of dip coating on both surfaces of a 12 μm-thick porous polyethylene film (porosity 45%), followed by drying, to obtain an organic/inorganic coating layer. Thereby, a separator with an organic/inorganic coating layer was prepared.

Comparative Example 2

100 Parts by weight of $Al_2O_3$ powder as inorganic particles, 2 parts by weight of sodium carboxyl methyl cellulose (CMC), and 4 parts by weight of styrene-butadiene rubber (SBR) were added and dissolved in distilled water ($H_2O$) for about 12 hours, to obtain a polymer solution. The polymer solution was subject to ball milling for pulverization and distribution of $Al_2O_3$ powder, to obtain a slurry for an insulating solution. After coating a slurry for an anode active material on a 15 μm-thick copper current collector, followed by drying and compressing, and the slurry for an insulating solution was coated thereon, followed by drying and compressing. Thereby, an electrode structure with an insulating layer was prepared.

Experimental Example

Evaluation for Distribution of Inorganic Particles and Binder Polymer in Organic/Inorganic Composite Porous Membrane The porous membrane was analyzed for its cross-section. As a result, it was confirmed that inorganic particles are totally distributed in a uniform pore size and exhibit a filling rate of 70% (and a porosity of 30%).

What is claimed is:

1. A method for preparing an organic/inorganic composite porous membrane for an electrochemical device, comprising:
   (S1) providing unit particles where one or more particles are selected from inorganic particles and organic particles or an agglomerate of the inorganic particles and the organic particles; coating the unit particles with a binder polymer in a solution of the binder polymer; passing the coated unit particles through a membrane into an aqueous solution; forming a slurry from the aqueous solution and the coated unit particles; and
   (S2) applying the slurry and then heating the unit particles to make the unit particles be bonded with each other on a porous polymer film substrate or a porous polymer non-woven substrate.

2. The method of claim 1, wherein the unit particles have an average diameter of 0.01 μm to 20 μm.

3. The method of claim 1, wherein the binder polymer in the coated unit particles is present at an amount of 1 part by weight to 30 parts by weight based on 100 parts by weight of the one or more particles selected from the inorganic particles and the organic particles.

4. The method of claim 1, wherein the inorganic particles are selected from the group consisting of inorganic particles having a dielectric constant of 5 or higher, inorganic particles having the ability to transport lithium ions, and a mixture thereof.

5. The method of claim 1, wherein the organic particles are selected from the group consisting of polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof.

6. The method of claim 1, wherein the binder polymer is selected from the group consisting of polyvinylidene fluoride-co-hexafluoropropylene, polyvinylidene fluoride-co-tri chloroethyl ene, polymethylmethacrylate, polyacrylonitrile, polyvinylpyrrolidone, polyvinylacetate polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, polystyrene, polyethylene, and a mixture thereof.

7. The method of claim 1, wherein in the organic/inorganic composite porous membrane, the one or more particles selected from the inorganic particles and the organic particles are filled and bound to each other by the binder polymer, from which interstitial volumes are formed between the one or more particles, and the interstitial volumes between the one or more particles become empty spaces to form pores.

8. The method of claim 1,
   wherein in the (S1), the binder polymer and the one or more particles selected from the inorganic particles and the organic particles or the agglomerate of the inorganic particles and the organic particles are mixed in a solvent to obtain the solution, the solution is passed through the membrane with uniform pores and dropped in the aqueous solution containing a surfactant, aqueous solution maintains its temperature above a boiling point of the solvent, and the drops of the solution are solidified directly after passing through the membrane, thereby forming the coated unit particles.

9. The organic/inorganic composite porous membrane prepared according to the method of claim 1, comprising: the one or more particles selected from the inorganic particles and the organic particles in multiple layers; and the binder polymer,
   wherein the one or more particles selected from the inorganic particles and the organic particles are bonded with each other by the binder polymer completely surrounding the surface of each of the one or more particles selected from the inorganic particles and the organic particles, and the one or more particles are filled at a rate of 65% to 70% in the organic/inorganic composite porous membrane.

10. The organic/inorganic composite porous membrane of claim 9, wherein the binder polymer is present at an amount of 1 part by weight to 30 parts by weight based on 100 parts by weight of the one or more particles selected from the inorganic particles and the organic particles.

11. The organic/inorganic composite porous membrane of claim 9, wherein the inorganic particles are selected from the group consisting of inorganic particles having a dielectric constant of 5 or higher, inorganic particles having the ability to transport lithium ions, and a mixture thereof.

12. The organic/inorganic composite porous membrane of claim 9, wherein the organic particles are selected from the group consisting of polyethylene (PE), polystyrene (PS), polymethylmethacylate (PMMA), polyacetal (polyoxymethylene, POM), polyamide (PA), polycarbonate (PC), modified polyphenylene ether (m-PPE), polybutylene terephthalate (PBT), and a mixture thereof.

13. The organic/inorganic composite porous membrane of claim 9, wherein the binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, polystyrene, polyethylene, and a mixture thereof.

14. The organic/inorganic composite porous membrane of claim 9, wherein in the organic/inorganic composite porous membrane, the one or more particles selected from the inorganic particles and the organic particles are filled and bound to each other by the binder polymer, from which interstitial volumes are formed between the inorganic particles and the organic particles, and the interstitial volumes between the inorganic particles and the organic particles become empty spaces to form pores.

15. The organic/inorganic composite porous membrane of claim 9, wherein the organic/inorganic composite porous membrane has a thickness of 0.5 μm to 50 μm.

16. The electrochemical device, comprising a cathode, an anode, and a separator interposed between the cathode and the anode, wherein the separator is the organic/inorganic composite porous membrane of claim 9.

17. The electrochemical device, comprising a cathode, an anode, and a separator interposed between the cathode and the anode,
wherein the separator comprises the porous polymer film substrate or the porous polymer non-woven substrate having multiple pores, and the organic/inorganic composite porous membrane of claim 9, formed on at least one surface of the porous polymer film substrate or the porous polymer non-woven substrate.

18. An electrode structure, comprising an electrode current collector; an electrode active material layer formed on at least one surface of the electrode current collector; and the organic/inorganic composite porous membrane of claim 9, formed on another surface of the electrode current collector.

19. The electrochemical device, comprising a cathode, an anode, and an electrolyte solution, wherein at least one of the cathode and the anode is the electrode structure of claim 18.

* * * * *